United States Patent
Petrany et al.

(10) Patent No.: US 12,165,417 B2
(45) Date of Patent: Dec. 10, 2024

(54) OBJECT DETECTION VISION SYSTEM

(71) Applicant: Caterpillar Inc., Peoria, IL (US)

(72) Inventors: Peter J. Petrany, Dunlap, IL (US);
Matthew A. Guttag, Dunlap, IL (US);
Jacob C. Maley, Germantown Hills, IL (US);
Vamsi K. Pannala, Peoria, IL (US);
Robert S. Mcfarland, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 385 days.

(21) Appl. No.: 17/648,795

(22) Filed: Jan. 24, 2022

(65) Prior Publication Data

US 2023/0237806 A1 Jul. 27, 2023

(51) Int. Cl.
*G06V 20/58* (2022.01)
*B60K 35/00* (2006.01)
(Continued)

(52) U.S. Cl.
CPC .............. *G06V 20/58* (2022.01); *B60K 35/00* (2013.01); *B60R 1/00* (2013.01); *B60R 11/04* (2013.01); *G06T 5/80* (2024.01); *G06T 7/70* (2017.01); *G06V 10/80* (2022.01); *B60K 35/10* (2024.01); *B60K 2360/1438* (2024.01); *B60K 2360/1468* (2024.01); *B60R 2300/301* (2013.01); *B60R 2300/60* (2013.01)

(58) Field of Classification Search
CPC ........ G06V 20/58; G06V 10/80; G06V 20/52; B60K 35/00; B60K 35/10; B60K 2360/1438; B60K 2360/1468; B60K 2360/176; B60K 2360/177; B60K 35/28; B60R 1/00; B60R 11/04; B60R 2300/301; B60R 2300/60; G06T 5/80; G06T 7/70; G06T 11/00
See application file for complete search history.

(56) References Cited

U.S. PATENT DOCUMENTS 9,691,150 B2 6/2017 Miyasa et al.
10,430,641 B2 10/2019 Gao
(Continued)

FOREIGN PATENT DOCUMENTS

CN 105823416 A 8/2016
CN 112102372 A 12/2020
(Continued)

OTHER PUBLICATIONS

Written Opinion and International Search Report for Int'l. Patent Appln. No. PCT/US2023/010370, mailed May 4, 2023 (10 pgs).

*Primary Examiner* — Said M Elnoubi (57) ABSTRACT

An object detection vision system and methods are disclosed. A method for detecting objects in a vision system of an industrial machine includes receiving image data from one or more vision cameras and receiving detection data from one or more detect devices. The detection data includes one or more detected objects. The method includes combining the detection data and the image data and transforming the detection data in the image data based on one or more objects in the image data. The method also includes displaying an indication of the detected one or more objects in the image data based on the transformed detection data.

11 Claims, 6 Drawing Sheets

(51) Int. Cl.
  *B60R 1/00*   (2022.01)
  *B60R 11/04*   (2006.01)
  *G06T 5/80*   (2024.01)
  *G06T 7/70*   (2017.01)
  *G06V 10/80*   (2022.01)
  *B60K 35/10*   (2024.01)

(56) References Cited

U.S. PATENT DOCUMENTS

| | | |
|---|---|---|
| 10,930,037 B2 | 2/2021 | Namiki et al. |
| 2014/0362220 A1* | 12/2014 | Izumikawa ............. G01S 17/89 |
| | | 348/148 |
| 2020/0074190 A1 | 5/2020 | Khakharia et al. |
| 2021/0181351 A1 | 6/2021 | Ge et al. |

FOREIGN PATENT DOCUMENTS

| | | |
|---|---|---|
| KR | 20130069912 A | 6/2013 |
| KR | 20140112043 A | 9/2014 |
| KR | 20150025008 A | 3/2015 |
| KR | 20170099252 A | 8/2017 |
| KR | 20170103288 A | 9/2017 |
| TW | I456985 B | 10/2014 |
| WO | 2019137915 A1 | 7/2019 |

\* cited by examiner

OBJECT DETECTION VISION SYSTEM

TECHNICAL FIELD

The present disclosure relates generally to vision systems for industrial machines, and more particularly, to an object detection vision system for such industrial machines.

BACKGROUND

Various industrial machines, such as those used to dig, loosen, carry, compact, or perform other earth moving tasks, may be equipped with a vision system having one or more cameras. The vision system may provide an operator of such industrial machines with various views of the environment around the industrial machine and/or with a complete surround view (e.g., a 3D view) of the environment. Such vision systems may utilize typical video cameras for providing a video feed for each view. However, typical video cameras are only capable of visually providing a display of an environment and are not capable of detecting objects around the environment near the industrial machine or providing an indication of such objects. Object detection and object classification may be useful when objects are difficult to see in the displays from the video cameras. Further, automatic object detection and object classification capabilities may enable autonomous operation of the industrial machine.

Replacing or upgrading typical video cameras with object detection devices (e.g., detection cameras capable of object detection) may require complex software and hardware updates on a respective industrial machine that require unnecessary downtime of an industrial machine from operation. Accordingly, operational and/or maintenance costs may increase due to having to replace typical video cameras with such detection devices. Further, it may be difficult to correctly map object detection information from the object detection devices onto the displayed images provided by the typical video cameras.

U.S. Patent Application Publication No. 20210181351, published on Jun. 17, 2021 ("the '351 publication"), describes methods and devices related to autonomous driving. The methods of the '351 publication include detecting objects in received camera images and detecting the same objects in received LIDAR images. The methods further include combining the detected objects in the camera images with the detected objects in the LIDAR images to display two bounding boxes (e.g., one from the camera object detection and one from the LIDAR object detection) in the camera images. However, the methods and devices of the '351 publication do not address providing object detection in an existing vision system having cameras without object detection capabilities.

The object detection vision system of the present disclosure may solve one or more of the problems set forth above and/or other problems in the art. The scope of the current disclosure, however, is defined by the attached claims, and not by the ability to solve any specific problem.

SUMMARY

In one aspect, a method for detecting objects in a vision system of an industrial machine is disclosed. The method includes: receiving image data from one or more vision cameras; receiving detection data from one or more detect devices, wherein the detection data includes one or more detected objects; combining the detection data and the image data; transforming the detection data in the image data based on one or more objects in the image data; and displaying an indication of the detected one or more objects in the image data based on the transformed detection data.

In another aspect, an object detection vision system is disclosed. The object detection vision system includes: one or more vision cameras; one or more detect devices; and a controller configured to: receive image data from one or more vision cameras; receive detection data from one or more detect devices, wherein the detection data includes one or more detected objects; combine the detection data and the image data; transform the detection data in the image data based on one or more objects in the image data; and display an indication of the detected one or more objects in the image data based on the transformed detection data.

In yet another aspect, a method for detecting objects in a vision system of an industrial machine is disclosed. The method includes: receiving image data from one or more vision cameras; receiving detection data from one or more object detection cameras having one or more processors for detecting objects, wherein the detection data includes first coordinates of one or more detected objects; combining the first coordinates and the image data; transforming the first coordinates in the image data based on one or more objects in the image data to generate second coordinates of the one or more detected objects in the image data; and displaying an indication of the detected one or more objects in the image data based on the second coordinates of the one or more detected objects.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
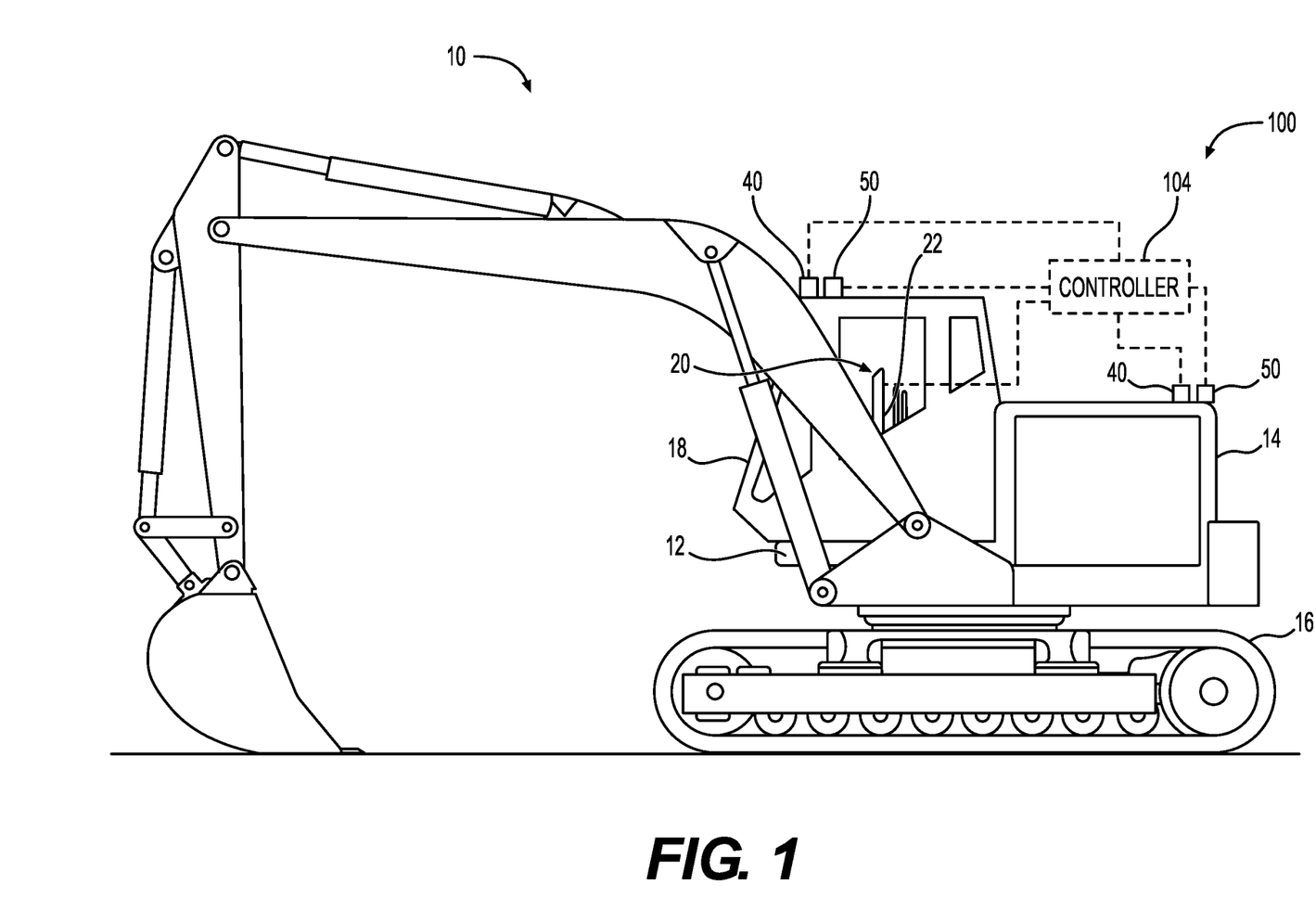
FIG. 1 is a schematic view of an industrial machine having an object detection vision system, according to aspects of the disclosure.

FIG. 1 illustrates a schematic view of an industrial machine 10 having an object detection vision system 100, according to aspects of the disclosure. The disclosure herein may be applicable to any type of industrial machine or vehicle, however, reference will be made below particularly to an excavator. For example, industrial machine 10 may include, but is not limited to, an off-highway truck, a bulldozer, an articulated truck, a scraper, a compactor, a paver, a wheel loader, a motor grader, or any other type of industrial machine. As shown in FIG. 1, industrial machine 10 may include a frame 12 and machinery 14. Frame 12 generally supports the various assemblies and mechanical systems of the industrial machine 10 and may be supported on a ground surface by transport mechanisms, such as one or more tracks 16 or wheels. Frame 12 may support the machinery 14, which may include engines, motors, generators, batteries, pumps, air compressors, hydraulic fluid storage tanks, and/or any other equipment necessary to power and operate industrial machine 10. Industrial machine 10 may also include an implement, such as a digging tool, a fork lift, a blade, a dump bed, or any other apparatus for performing a task.

Frame 12 may further support an operator cab 18, from which a user, or operator, may maneuver and control industrial machine 10 via one or more operator interfaces 20, such as user interfaces, controls, and/or displays 22. The operator interfaces 20 may include steering devices (e.g., steering wheel and/or joysticks), and one or more displays 22, such as a touch-screen display device, keypad with buttons, or the like. It is understood that aspects of the operator interfaces 20 and displays 22 may be located remote from the industrial machine 10.

Industrial machine 10 further includes an object detection vision system 100 for increasing awareness around industrial machine 10 and, if desired, for controlling aspects of industrial machine 10. The object detection vision system 100 may include a controller 104, such as an electronic control module (ECM), one or more vision cameras 40, one or more detect devices 50, and one or more of the operator interfaces 20 and displays 22. The one or more vision cameras 40, one or more detect devices 50, operator interfaces 20 and displays 22 may be in communication with controller 104 (as shown in FIG. 1 by the dashed lines) through wired communication lines and/or through wireless means.

The one or more vision cameras 40 may include any type of video camera or the like for capturing image data of an environment around industrial machine 10. The one or more vision cameras 40 may be attached or mounted to any part of industrial machine 10. As used herein, "camera" generally refers to a device configured to capture and transmit image data, for example, still images, video streams, time lapse sequences, or the like. The one or more vision cameras 40 may include cameras without object detection capabilities. The one or more vision cameras 40 may include a monocular or stereo digital camera, a high-resolution digital camera, or any suitable digital camera. For example, the one or more vision cameras 40 may include a color monocular digital camera or a stereo digital camera (e.g., a camera set including two monochrome camera imagers and a color monocular imager). The one or more cameras 40 may send or transfer the captured image data to controller 104, as detailed further below. Cameras 40 may capture two-dimensional (2D) images and are not capable of providing range information or object detection information within the image data. For example, cameras 40 may be without object detection capabilities. In some cases, cameras 40 may capture a complete surround view of the environment of industrial machine 10. Thus, the cameras 40 may have a 360-degree horizontal field of view (FOV). While only two vision cameras 40 are shown in FIG. 1, it is understood that industrial machine 10 may include any number of cameras 40 arranged on industrial machine 10 in any manner or location. The cameras 40 may include intrinsic and extrinsic characteristics. For example, the intrinsic characteristics may include internal parameters of the cameras 40, such as a focal length, an optical center, a pixel azimuth angle, a pixel elevation angle, or any other internal parameter associated with cameras 40. The extrinsic parameters may include external parameters of the cameras 40, such as a roll, a pitch, a yaw, an angle of depression with respect to a ground level, a horizontal position, a vertical position, or any other external parameter associated with cameras 40.

The one or more detect devices 50 may include any type of object detection device, such as a detection camera (including monocular and/or stereo cameras), optical sensors, radar sensors, LIDAR sensors, sonar sensors, etc. to scan for or otherwise detect one or more objects ahead and/or around the surroundings of industrial machine 10. The objects may include, for example, a person, an animal, a piece of equipment, another vehicle, and/or any other type of object in the environment around industrial machine 10. The detect devices 50 may be attached or mounted to any part of industrial machine 10 in locations generally corresponding to locations of the vision cameras 40. For example, each detect device 50 may be placed substantially adjacent a vision camera 40 such that the vision camera 40 and the corresponding detect device 50 include a substantially similar, but different, field of view (FOV). The detect devices 50 may include substantially similar, but different, extrinsic parameters as the vision cameras 40 (e.g., the detect devices 50 may include slightly different roll, pitch, yaw, angle of depression, horizontal position, and/or vertical position than the vision cameras 40). The intrinsic parameters of detect devices 50 may vary from the intrinsic parameters of vision cameras 40. For example, the focal length, optical center, pixel azimuth angle, and pixel elevation angle of the detect devices 50 may be different than the focal length, optical center, pixel azimuth angle, and pixel elevation angle of the vision cameras 40.

While detect devices 50 may include any type of object detection device (e.g., monocular and/or stereo detection camera, optical sensors, radar sensors, LIDAR sensors, sonar sensors, etc.), reference will be made in particular to a detection camera. As used herein, a "detection camera" may include a device having a processor (not shown), such as a field-programmable gate array (FPGA), an image signal processor, or the like, configured to capture detection data (e.g., image data) and detect one or more objects present in the detection data (e.g., within a FOV of the detection camera). The detection camera may generate three-dimensional (3D) coordinates of the one or more objects within the detection data. For example, the processor of the detect device 50 may use machine learning and/or artificial intelligence (e.g., a neural network or the like) to generate 2D bounding boxes using a known detection algorithm, identify objects within the bounding boxes and compute the 3D position and/or velocity of the objects. The detect devices 50 may thus compute 3D coordinates of a center of the objects (e.g., the center of the bounding boxes) within a coordinate space based on the extrinsic and intrinsic parameters of the detect cameras 50. The detect devices 50 may send the 3D coordinates of the objects to controller 104, as detailed further below. It is understood that detect devices 50 may detect objects and generate the 3D coordinates by any means known in the art.

Displays 22 may include one or more devices used to present an output of controller 104 to the operator of industrial machine 10. Displays 22 may include a single-screen display, such as an LCD display device, or a multi-screen display. Displays 22 may include multiple displays for displaying different content (e.g., image data from different cameras 40) on the same display or on different displays 22. Displays 22 may be in communication with controller 104 through wired communication and/or wireless means (as shown in FIG. 1 by dashed lines) and may be located onboard industrial machine 10 and/or remote from industrial machine 10. As will be described in more detail below, displays 22 may be used to display a representation of an environment around industrial machine 10 based on image data captured by cameras 40, and may display an indication of the detected objects 504 (FIGS. 5A-5C), as detailed further below. Displays 22 may include a touch sensitive screen, and thus may have the capability to input data (e.g., from a user input) and to record information.

Figure 2:
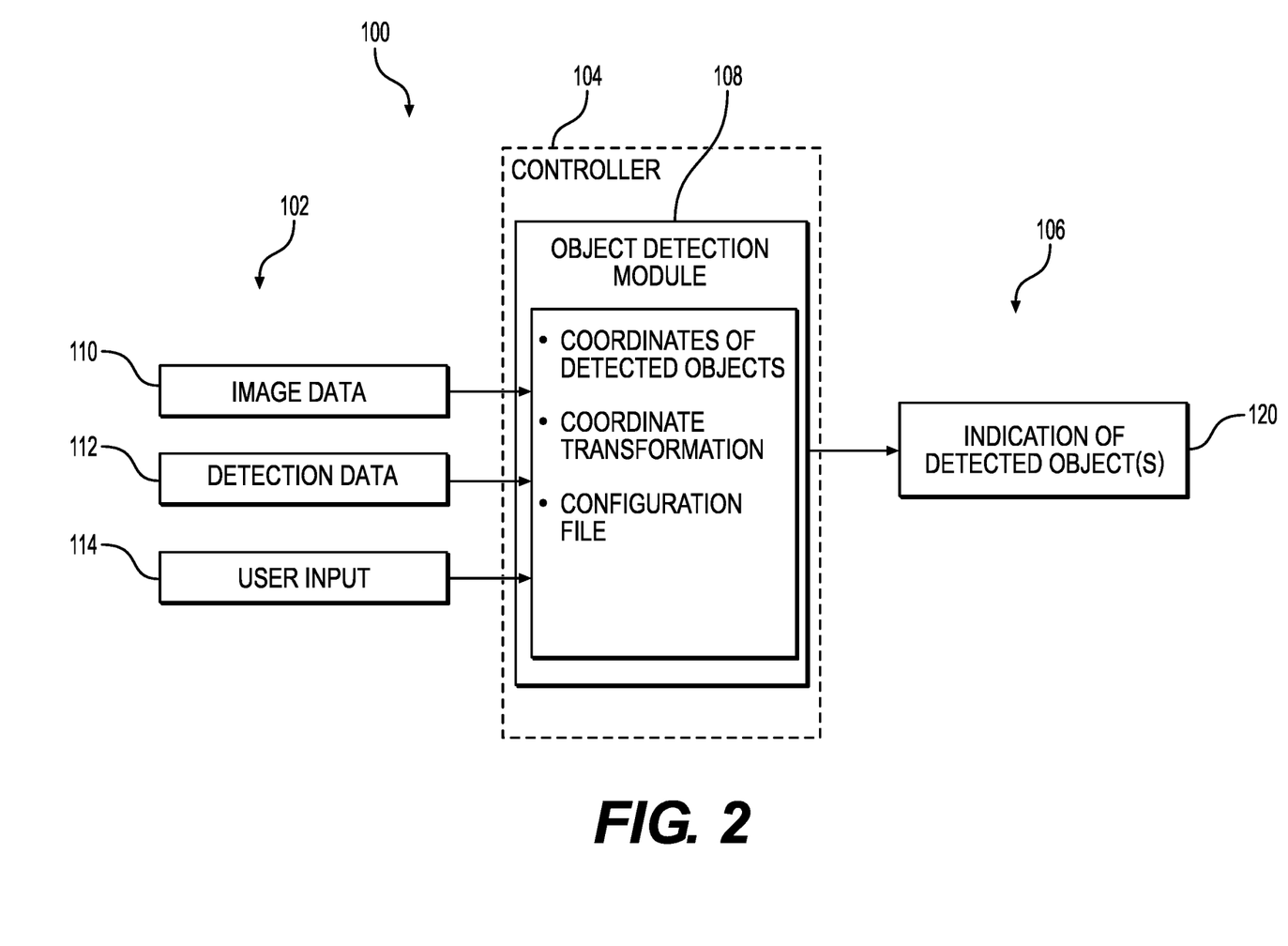
FIG. 2 is a schematic view of the exemplary object detection vision system for the industrial machine of FIG. 1.

FIG. 2 is a schematic view of the exemplary object detection vision system 100 for operation and/or control of at least portions of industrial machine 10. Object detection vision system 100 may include inputs 102, controller 104, and outputs 106. Inputs 102 may include image data 110 from the one or more vision cameras 40, detection data 112 from the one or more detect devices 50, and/or user input 114 from the operator interfaces 20 or displays 22. The image data 110 may include the image data captured by vision cameras 40. The detection data 112 may include the 3D coordinates of the detected objects as detected and generated by detect devices 50. User input 114 may include a selection received via the operator interfaces 20 or displays 22 from a user to transform the 3D coordinates from the detect devices 50 to 3D coordinates of objects in the image data 110 from the vision cameras 40, as detailed further below.

Outputs 106 may include, for example, an indication 120 of the detected objects. Controller 104 also includes an object detection module 108. Object detection module 108 may receive inputs 102, implement a method 300 for detecting objects in a vision system and/or a method 400 for calibrating the object detection vision system 100, and control outputs 106, as described with reference to FIGS. 3 and 4 below.

Controller 104 may embody a single microprocessor or multiple microprocessors that may include means for detecting objects in a vision system of industrial machine 10. For example, controller 104 may include a memory, a secondary storage device, and a processor, such as a central processing unit or any other means for accomplishing a task consistent with the present disclosure. The memory or secondary storage device associated with controller 104 may store data and/or software routines that may assist controller 104 in performing its functions, such as the functions of method 300 of FIG. 3 and method 400 of FIG. 4. Further, the memory or secondary storage device associated with controller 104 may also store data received from the various inputs 102 associated with object detection vision system 100. Numerous commercially available microprocessors can be configured to perform the functions of controller 104. It should be appreciated that controller 104 could readily embody a general machine controller capable of controlling numerous other machine functions. Alternatively, a special-purpose machine controller could be provided. Further, controller 104, or portions thereof, may be located remote from industrial machine 10. Various other known circuits may be associated with controller 104, including signal-conditioning circuitry, communication circuitry, hydraulic or other actuation circuitry, and other appropriate circuitry.

Controller 104 may also include stored values for use by module 108. For example, the stored values may include the coordinates of the detected objects from detect devices 50, a coordinate transformation, and a configuration file. The coordinates of the detected objects may be updated as industrial machine 10 and/or the objects move. The coordinate transformation may include a transformation of the coordinates from the detect devices 50 to coordinates in the image data 110 from the vision cameras 40, as detailed further below. The configuration file may include a stored calibration of the coordinate transformation such that module 108 may transform coordinates of newly detected objects into a coordinate system in the image data 110 for providing an indication 120 of the detected objects in the image data 110 via displays 22, as detailed further below.

The indication 120 of the detected objects may include a display (e.g., a highlight, a bounding box, etc.) of the detected objects displayed in the image data 110 via the displays 22, as detailed further below. Controller 104 may derive the indication 120 based on the coordinate transformation and may send the indication 120 to displays 22 for displaying the indication 120 on displays 22, as detailed further below.

INDUSTRIAL APPLICABILITY

The disclosed aspects of the object detection vision system 100 of the present disclosure may be used in any type of industrial machine 10 having a vision system with one or more vision cameras 40 and one or more detect devices 50.

Referring to FIG. 1, during operation of industrial machine 10, an operator may control industrial machine 10 to maneuver about the ground surface to perform a task. The vision cameras 40 may provide various views of the environment around industrial machine 10 on displays 22 as industrial machine 10 operates. However, the vision cameras 40 by themselves are not capable of detecting objects in the environment around industrial machine 10. Further, replacing the vision cameras 40 with detect devices 50 may require a complete software and/or hardware overhaul, thus may require unnecessarily long down time of a particular industrial machine 10, which may lead to increased costs. Thus, as detailed below with reference to FIGS. 3 and 4, object detection vision system 100 may detect objects using detect devices 50 and provide an indication of the detected objects in the image data 110 from vision cameras 40.

Figure 3:
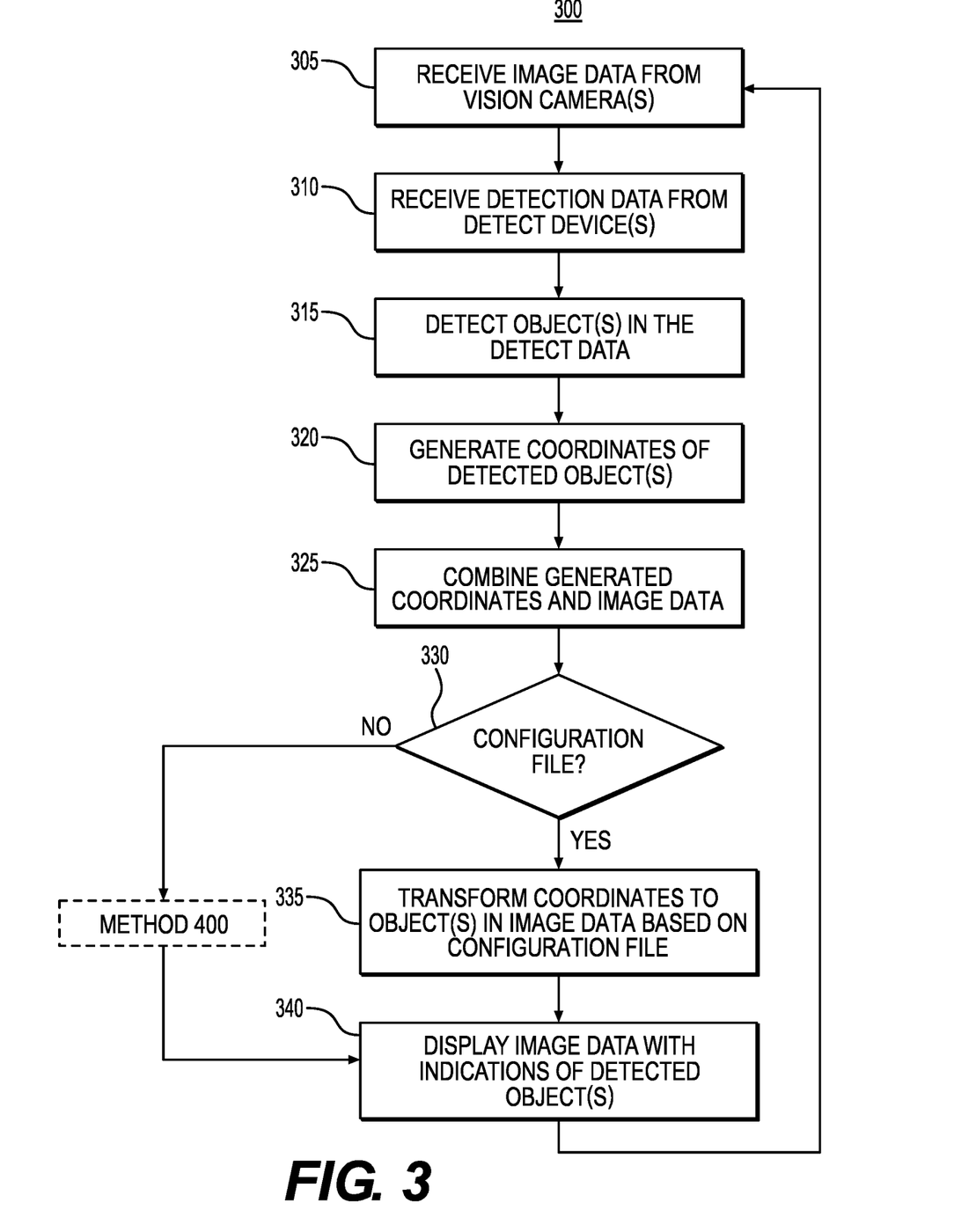
FIG. 3 provides a flowchart depicting an exemplary method for detecting objects in the object detection vision system of FIGS. 1 and 2.

FIG. 3 illustrates a flowchart depicting an exemplary method 300 for detecting objects in a vision system 100 of an industrial machine 10. In step 305, module 108 may receive image data 110 from vision cameras 40. For example, module 108 may receive a video stream from the one or more vision cameras 40 and display the image data 110 on displays 22.

Figure 5A:
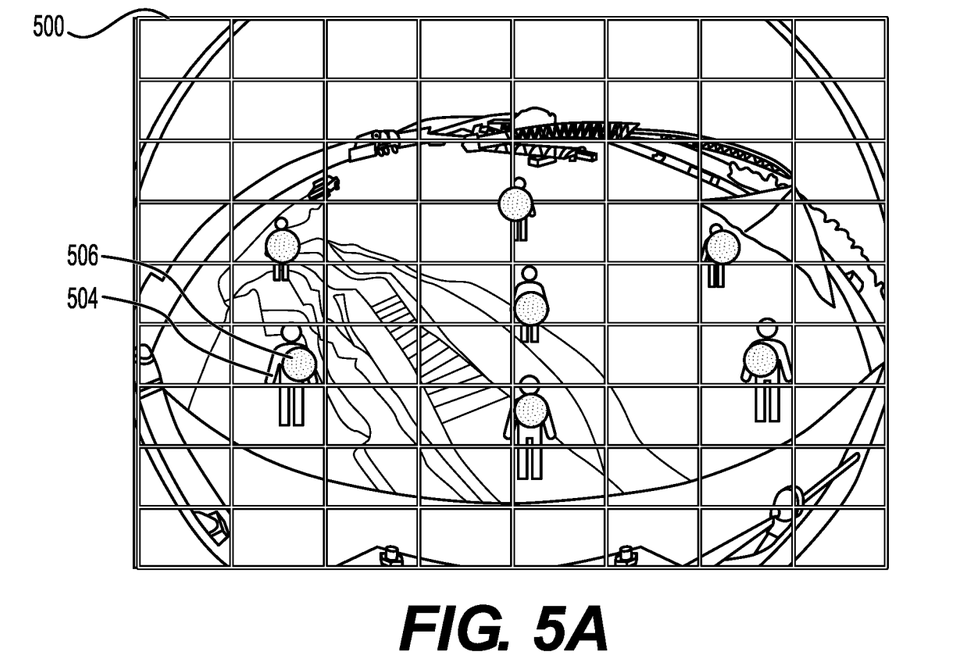
FIG. 5A-5C depict various field of views of the object detection vision system of FIGS. 1 and 2.

In step 310, module 108 may receive detection data 112 from detect devices 50. In step 315, module 108 may detect objects based on the detection data 112. The object detection may be performed by any means known in the art, as detailed above. With reference to FIG. 5A, an exemplary FOV 500 of the detect devices 50 is shown. The FOV 500 are not be displayed on displays 22 due to the detect devices 50 not being in direct communication with displays 22. Thus, the FOV 500 of FIG. 5A is for illustrative purposes only. The example of FIG. 5A shows a plurality of detected objects 504 around a work site in the FOV 500 of the detect devices 50 and an indication 506 of the detected objects 504. For clarity, only a single object 504 and a single indication 506 is referenced in FIG. 5A. However, it is understood that detect devices 50 may detect any number of objects within the FOV 500 of each detect device 50. The FOV 500 of FIG. 5A also illustrates an exemplary grid or coordinate system of the detect devices 50. While a square coordinate system is shown in FIG. 5A, it is understood that any type of coordinate system or grid may be used, such as, for example, a triangle grid or the like.

In step 320, module 108 may generate first coordinates of the detected objects. For example, module 108 may generate 3D coordinates of the detected objects in the coordinate system of the detect devices 50. In some examples, the received detection data 112 may include the generated first coordinates of the detected objects. For example, the detect devices 50 may detect the objects and generate first coordinates of the detected objects prior to sending the detection data 112 to module 108. Thus, step 315 and step 320 may be optional steps in that module 108 does not separately detect objects and generate the first coordinates of the detected objects.

Figure 5B:
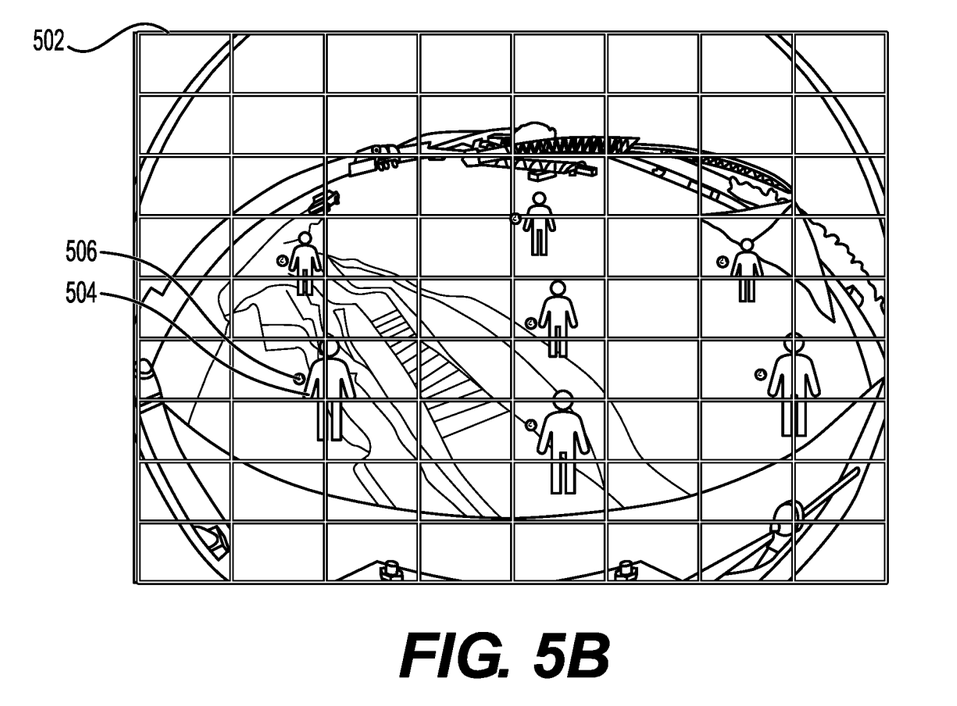

In step 325, module 108 may combine the detection data (e.g., the generated first coordinates) with the image data 110. For example, module 108 may overlay or map the generated first coordinates of the detect objects 504 from the detection data 112 onto the image data 110 from vision cameras 40. In some examples, module 108 may map the image data onto the first coordinates. With reference to FIG. 5B, a display of an exemplary FOV 502 of the vision cameras 40 is shown. The FOV 502 may be provided by the image data 110 from the vision cameras 40 and may be displayed on the displays 22, as detailed above. The example of FIG. 5B shows a plurality of objects 504 around the work site that are not detected or otherwise indicated in the FOV 502 of FIG. 5B. The first coordinates of the detected objects 504 from the detect device 50 on the FOV 502 of the vision cameras 40 may include the coordinate system of the detect devices 50. As shown in FIG. 5B, the plurality of objects 504 may be misaligned from the plurality of objects 504 in the FOV 500 of FIG. 5A due to the differences in the extrinsic and intrinsic parameters between the vision cameras 40 and the detect devices 50. Thus, in FIG. 5B, the first coordinates of the indications 506 of the detected objects 504 from the detect devices 50 may not align with the objects 504 in the image data 110.

In step 330, module 108 may determine whether a configuration file has been generated and stored. As detailed above, the configuration file may include a stored coordinate transformation. The coordinate transformation may include a mesh transform of the first coordinates from the detect devices 50 to second coordinates in a coordinate system of the FOV 502 of the vision cameras 40 based on the extrinsic and intrinsic differences between the detect devices 50 and the vision cameras 40. For example, the stored coordinate transformation may include a transformation of the coordinate system of the detect devices 50 to a coordinate system of the vision cameras 40 to align the first coordinates of the indications 506 of the detected objects 504 with the objects 504 in the image data 110 from the vision cameras 40 to generate second coordinates of the indications 508 of the detected objects 504.

Figure 5C:
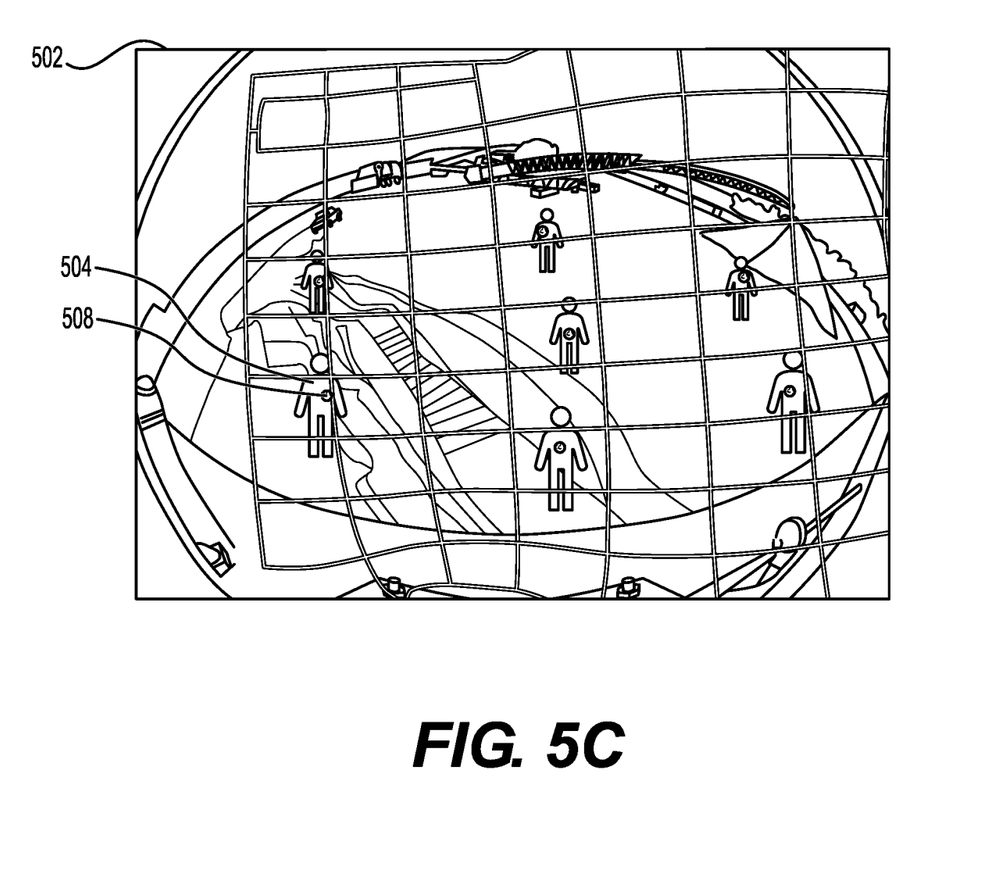

Thus, upon determining that there is a stored configuration file (e.g., a stored coordinate transformation) (step 330: YES), module 108 may transform the first coordinates to the objects 504 in the image data 110 based on the configuration file (step 335). Module 108 may generate indications 508 of the detected objects 504 in the image data 110 based on the transformed, second coordinates (as shown in FIG. 5C). In step 340, module 108 may display the image data 110 with the indications 508 of the detected objects 504 on the one or more displays 22. As detailed above, the indications 508 may include a highlight of the detected objects 504, a bounding box, a point, or any other indication 508 for indicating a detected object 504 on displays 22. As shown in FIG. 5C, the coordinate system or grid has been transformed from the coordinate system of the detect devices 50 due to the stored coordinate transformation.

Figure 4:
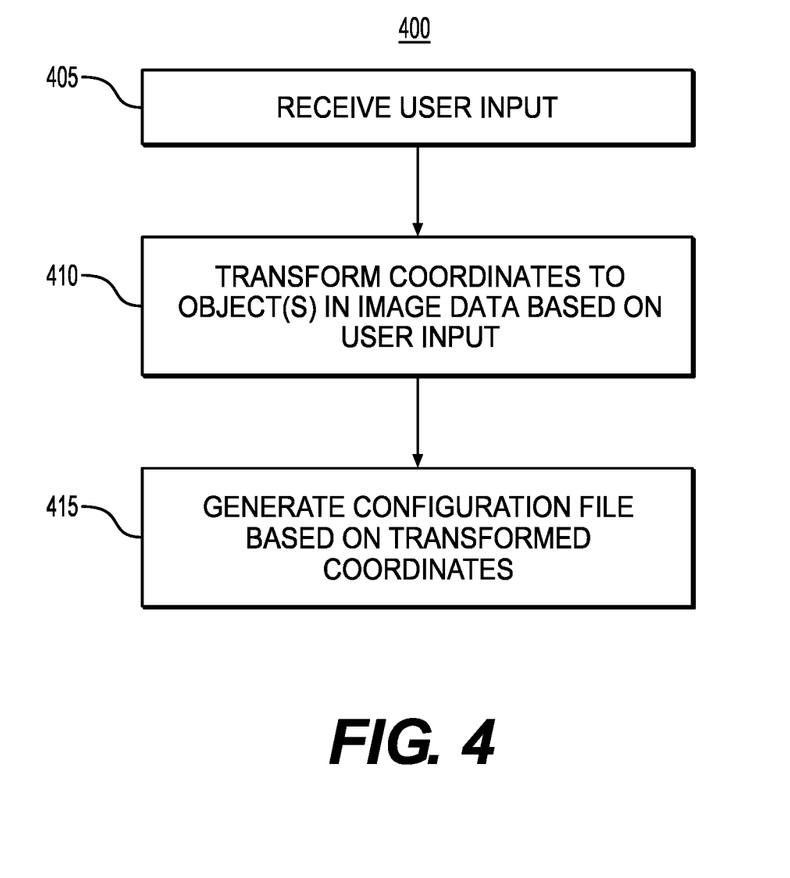
FIG. 4 provides a flowchart depicting an exemplary method for calibrating the object detection vision system of FIGS. 1 and 2.

During an initial calibration, module 108 may generate the configuration file. For example, when a configuration file is not stored (step 330: NO), module 108 may perform a method 400 for calibrating the object detection vision system 100.

FIG. 4 provides a flowchart depicting an exemplary method 400 for calibrating the object detection vision system 100. In step 405, module 108 may receive user input. For example, a user may interact with a touch screen display 22 (or other input device) to drag or otherwise move the indications 506 to align the indications 506 with the objects 504 in the image data 110 displayed on the one or more displays 22.

In step 410, module 108 may transform the first coordinates to the objects 504 in the image data 110 based on the user input. For example, as the user moves each indication 506, module 108 may transform the first coordinates of the indications 506 to generate transformed indications 508 having transformed, second coordinates in a transformed coordinate system (as shown in FIG. 5C).

In step 415, module 108 may then generate a configuration file based on the transformed second coordinates and store the configuration file for use, as detailed above. Module 108 may then display the image data 110 with the indications 508 of the detected objects 504 (step 340).

Module 108 may then continue to receive image data 110 from the vision cameras 40 (step 305) and detect data from the detect device 50 (step 310) to detect new objects. Thus, module 108 may continuously perform method 300 to display indications 508 of newly detected objects 504 within the FOV 500 and FOV 502. The newly detected objects 504 may include new objects within the FOV 500 and FOV 502 and/or may include the same detected objects 504 having moved with respect to FOV 500 and FOV 502 (e.g., due to the objects 504 themselves moving and/or due to industrial machine 10 moving).

The object detection vision system 100 of the present disclosure may provide for an improved object detection system for an industrial machine 10 having an existing vision system with one or more vision cameras 40. For example, the object detection vision system 100 may enable installation of detect devices 50 without requiring a complex and complete update of the onboard software of industrial machine 10. Further, object detection vision system 100 may more accurately display indications of detected objects on displays 22 of an existing vision system compared to prior art systems due to dedicated detect devices 50. Accordingly, the object detection vision system 100 may provide for an aftermarket system that may be relatively easily installed on an industrial machine 10 with an existing vision system having vision cameras 40 to enable object detection on such industrial machines 10. Accordingly, object detection vision system 100 may reduce unnecessary downtime of an industrial machine 10, and thus may save maintenance and installation costs associated with installing detect devices 50 on industrial machine 10. Further, object detection vision system 100 may enable object detection and object classification in an existing vision system of industrial machine 10 and may provide specific positions of the detected objects in the existing displays 22 from vision cameras 40. Thus, object detection vision system 100 may enable an operator to more efficiently and quickly complete a respective task and/or may enable autonomous operation of industrial machine 10.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for detecting objects in a vision system of an industrial machine, the method comprising:
   receiving image data from one or more vision cameras;
   receiving detection data from one or more detect devices, wherein the detection data includes first coordinates of one or more detected objects;
   combining the detection data and the image data;
   transforming the detection data in the image data based on one or more objects in the image data;
   displaying an indication of the detected one or more objects in the image data based on the transformed detection data;
   combining the first coordinates and the image data; and
   transforming the first coordinates to objects in the image data to generate second coordinates of the detected objects in the image data based on a stored coordinate transformation.

2. The method of claim 1, wherein the one or more detect devices include one or more processors for detecting objects.

3. The method of claim 1, wherein the one or more vision cameras include one or more cameras without object detection capabilities.

4. The method of claim 1, wherein transforming the first coordinates includes:
   receiving a user input of moving the first coordinates within the image data; and
   transforming the first coordinates to second coordinates based on the user input.

5. An object detection vision system, comprising:
   one or more vision cameras;
   one or more detect devices; and
   a controller configured to:
      receive image data from one or more vision cameras;
      receive detection data from one or more detect devices, wherein the detection data includes first coordinate of one or more detected objects;
      combine the detection data and the image data;
      transform the detection data in the image data based on one or more objects in the image data;
      display an indication of the detected one or more objects in the image data based on the transformed detection data;
      combine the first coordinates and the image data; and
      transform the first coordinates to objects in the image data to generate second coordinates of the detected objects in the image data based on a stored coordinate transformation.

6. The object detection vision system of claim 5, wherein the one or more detect devices include one or more processors for detecting objects.

7. The object detection vision system of claim 5, wherein the one or more vision cameras include one or more cameras without object detection capabilities.

8. The object detection vision system of claim 5, wherein transforming the first coordinates includes the controller configured to:
   receive a user input of moving the first coordinates within the image data; and
   transform the first coordinates to second coordinates based on the user input.

9. A method for detecting objects in a vision system of an industrial machine, the method comprising:
   receiving image data from one or more vision cameras;
   receiving detection data from one or more object detection cameras having one or more processors for detecting objects, wherein the detection data includes first coordinates of one or more detected objects;
   combining the first coordinates and the image data;
   transforming the first coordinates in the image data based on one or more objects in the image data to generate second coordinates of the one or more detected objects in the image data, wherein transforming the first coordinates includes transforming the first coordinates based on a stored coordinate transformation; and
   displaying an indication of the detected one or more objects in the image data based on the second coordinates of the one or more detected objects.

10. The method of claim 9, wherein the one or more vision cameras include one or more cameras without object detection capabilities.

11. The method of claim 9, wherein transforming the first coordinates includes:
    receiving a user input of moving the first coordinates within the image data; and
    transforming the first coordinates to the second coordinates based on the user input.

* * * * *